(12) United States Patent
Numbers et al.

(10) Patent No.: US 6,250,588 B1
(45) Date of Patent: Jun. 26, 2001

(54) FORCED AIR DE-ICING AND WASHING SYSTEM ATTACHED TO THE DISTAL END OF A BOOM

(75) Inventors: Keith E. Numbers, Dayton, OH (US); Lee A. Williams, Orlando, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/361,834

(22) Filed: Jul. 27, 1999

(51) Int. Cl.[7] .................................................. B64D 15/04
(52) U.S. Cl. ........................................................ 244/134 C
(58) Field of Search ........................ 244/134; 134/102.1, 134/102.2, 123, 169, 172; 15/312.1, DIG. 2

(56) References Cited

U.S. PATENT DOCUMENTS

| | | | | |
|---|---|---|---|---|
| 2,788,009 | * | 4/1957 | Lones | 134/102 |
| 3,655,130 | * | 4/1972 | Patrick | 239/172 |
| 4,711,395 | * | 12/1987 | Handfield | 239/14.2 |
| 4,723,733 | * | 2/1988 | McClinchy | 244/134 C |
| 5,069,400 | * | 12/1991 | Kovaletz | 244/136 |
| 5,134,266 | * | 7/1992 | Peppard | 244/134 R |
| 5,244,168 | | 9/1993 | Williams | 244/134 |
| 5,746,396 | * | 5/1998 | Thorton-Trump | 244/134 R |
| 5,755,404 | | 5/1998 | Numbers | 244/134 |
| 6,029,934 | * | 2/2000 | Foster | 244/134 C |
| 6,045,092 | * | 4/2000 | Foster | 244/134 C |
| 6,047,926 | * | 4/2000 | Stanko et al. | 244/134 C |

* cited by examiner

*Primary Examiner*—Galen L. Barefoot
(74) *Attorney, Agent, or Firm*—Bobby D. Scearce; Thomas L. Kundert

(57) ABSTRACT

A forced air aircraft de-icing system is described, which in a preferred embodiment includes a vehicle having a articulable aerial boom mounted thereon with an operator platform disposed on the distal end of the boom, a compressed air source including a compressor and power source operatively attached to the distal end of the boom at or below the operator platform, and a high speed air jet nozzle operatively attached to the outlet of the compressor for directing a high speed air jet against the surface of an aircraft in the removal of snow and ice therefrom.

18 Claims, 3 Drawing Sheets

FORCED AIR DE-ICING AND WASHING SYSTEM ATTACHED TO THE DISTAL END OF A BOOM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for de-icing aircraft, and more particularly to a system utilizing high speed air for the forced air mechanical removal of snow and ice from the surface of an aircraft.

Prior art de-icing systems and methods have typically consisted of spraying large quantities of de-icing fluids onto snow and ice-covered aircraft surfaces. Though effective, prior art methods normally use environmentally hazardous fluids and therefore require expensive associated systems for fluid storage, usage, collection, recycling, and disposal. Certain prior systems utilize a high-speed air jet blast (alone or in combination with various de-icing fluids) to mechanically dislodge snow and ice, rather than melting it with fluids by chemical or thermal means, and exhibit the advantage of greatly reducing the amounts of fluids required.

U.S. Pat. No. 2,422,746 to Patterson describes a high-pressure air and liquid jet positioned at the forward portion of an airplane wing, so that the jet and the fluid ejected underlie any film of ice that forms on the wing edges and surfaces, tear off accumulations of ice and snow on the forward edges of the wing, and allow the air stream over the wing to tear off the remaining ice accumulated on the rear and upper surfaces of the wing. This system is inappropriate for de-icing aircraft prior to takeoff, and adds to the expense, complexity, weight, and fuel usage in modern aircraft.

U.S. Pat. No. 5,244,168 to Williams describes forced air de-icing using air entrained de-icing fluid (Type I and Type II), a source of compressed air and a mixing nozzle coupled to the source fluid and compressed air which produces the jet air blast, with various fluid spray patterns. The primary parameter for the air jet blast effectiveness is described as momentum per unit mass (air jet velocity). The Williams method sweeps an aircraft surface with an air jet blast alone to remove as much snow and ice as possible and uses the entrained fluid to complete the removal process. Williams uses a conventional turbine auxiliary power unit (APU) as the compressed air source, capable of heated (~400° F.) or unheated output, with controlled temperature, pressure and flow rate. An air conduit of unspecified design delivers compressed air to a mixing nozzle depicted in the figures as a straight-sided converging (conical) configuration. The air conduit is configured to enhance heat transfer to an adjacent fluid conduit as a means of heating the fluid. Compressed air is delivered to the mixing nozzle at flow rates of 50–200 mph. Working distance to the aircraft is stated to be up to ten feet. Air jet blasts of 100–200 mph are described as sufficient to mechanically dislodge snow and ice off a wing previously prepared with Type II anti-icing fluid, which is consistent with the operational characteristics of Type II fluid having ice shearing capabilities at aircraft take-off speeds in the same range. A prototype mobile vehicle constructed by Williams includes a Trump de-icing truck with a Garrett APU installed in the rear. High pressure hose of the type used for aircraft engine air starter systems is used in the air conduit along with aluminum pipe of three-inch diameter. The prototype aluminum nozzle is flared with a narrow slot opening. The entire teachings of the Williams patent are incorporated by reference herein.

U.S. Pat. No. 5,755,404 to Numbers describes a system for forced air de-icing of aircraft that includes a source of pressurized air and an axi-symmetric, high momentum focused air jet nozzle having an inlet of diameter D and an outlet of diameter d with an axisymmetric contour defined by a converging portion of first radius near the inlet and a reflex portion of second radius near the outlet, the converging and reflex portions being connected by a convergent conical portion tangent to both the converging and reflex portions, wherein the angle of convergence is equal to or less than 30°, D is equal to or greater than 2d, the first radius is equal to or greater than D, the second radius is equal to or greater than d, and the nozzle length is equal to or greater than 1.5 D. The entire teachings of the Numbers patent are incorporated by reference herein.

In a related conventional system, Landoll Corporation supplies for its Model TM-1800 Deicer/Washer truck a modification kit including a bracket for mounting a standard MA-1A turbine APU to the rotating boom of the truck using a trombone air tube assembly on the boom via a braided high-pressure hose and aluminum 90° elbow fixtures, and a generally conically shaped nozzle. This system uses a jet air blast for mechanically dislodging snow and ice.

The prior art systems suffer from one or more disadvantages as a result of the operational inefficiency of the placement of the compressed air source distant from the high speed air delivery nozzle, the consequence of which is that high velocity air flow through the delivery conduit, along with the flow of any de-icer fluid that may be inserted into the air flow for facilitating snow and ice removal from the surface of an aircraft, is subjected to an excessively tortuous path which promotes excessive pressure loss in the flow and substantially decreases efficiency of the compressed air source and of the snow and ice removal process.

The invention solves or substantially reduces in critical importance problems with prior art de-icing systems as just suggested by providing a forced air de-icing system having a compressed air source disposed near the delivery nozzle of the forced air delivery system, preferably near, below or within the operator platform containing the controls, for selectively directing the high speed air flow onto the surface of an aircraft. The invention provides the advantages over prior art systems including higher efficiency of operation, lower equipment cost, lower maintenance costs, improved operator directional control of high speed air at the point of application on the surface of an aircraft, increased efficiency of snow and ice removal from the aircraft, and lower system operating costs.

The invention also provides a fast, economical means of removing snow, ice and sleet, and other frozen deposits from pavements, aircraft ground support equipment, cargo containers, vehicles and other surfaces. Additionally, the invention provides for small quantities of water and/or liquid cleaning agents to be injected into the air stream either upstream or downstream of the nozzle. This high velocity air stream-liquid combination can aggressively wash or decontaminate an aircraft, ground support equipment, cargo containers, vehicles, pavements and other surfaces. This invention offers an advantage over prior art systems that require large quantities of water, de-icing fluid, and soap and which were substantially labor intensive. For both de-icing and cleaning, a liquid jet may be positioned such that the liquid stream enters the high speed air stream downstream of the air nozzle. These flows combine to form a powerful force for cleaning or de-icing a surface.

The functional components including the air compressor, power supply and transmission which connects the power supply to the air compressor are described, and the configurations of the components as installed on a vehicle are identified which provide optimized system integration in terms of operational efficiency and cost of ownership. Because the conventional forced air de-icing systems are manually controlled, ineffective and inefficient operation of the de-icer system may result from operator error. The invention suggests methods for automated system control to avoid problems associated with operator control.

As used herein, the term "de-icing" is intended to define and include the removing of snow, ice, freezing rain, sleet, frost, and other materials normally understood to be the objects of aircraft de-icing procedures.

It is therefore a principal object of the invention to provide an improved aircraft de-icing system and method.

It is a further object of the invention to provide an aircraft de-icing system and method using forced air.

It is another object of the invention to provide an aircraft de-icing system and method wherein the forced air is delivered with increased efficiency.

It is yet another object of the invention to provide an aircraft de-icing system and method having the high speed air source disposed near the delivery nozzle and operator platform of the delivery system.

It is another object of the invention to provide an aircraft de-icing system wherein the length of the conduit required to connect the high speed air source to the delivery nozzle is minimized.

It is yet another object of the invention to provide a forced air aircraft de-icing system wherein the source of high speed air and the delivery nozzle connected thereto are structured separately from the supporting delivery vehicle and aerial boom.

It is another object of the invention to provide a forced air aircraft de-icing system wherein the airflow pressure and airflow energy losses between the source of high speed air and the deliver nozzle are minimized.

It is yet another object of the invention to provide a forced air aircraft de-icing system wherein the position of the delivery nozzle is substantially remotely controllable.

It is another object of the invention to provide a forced air aircraft de-icing system of minimum physical size, and which is characterized by substantial ease of installation on and removal from a supporting vehicle.

These and other objects of the invention will become apparent as the detailed description of representative embodiments proceeds.

SUMMARY OF THE INVENTION

In accordance with the foregoing principles and objects of the invention, a forced air aircraft de-icing system is described, which in a preferred embodiment includes a vehicle having a articulable aerial boom mounted thereon with an operator platform disposed on the distal end of the boom, a compressed air source including a compressor and power source operatively attached to the distal end of the boom at or below the operator platform, and a high speed air jet nozzle operatively attached to the outlet of the compressor for directing a high speed air jet against the surface of an aircraft in the removal of snow and ice therefrom.

BRIEF DESCRIPTION OF THE DRAWINGS

The invention will be more clearly understood from the following detailed description of representative embodiments thereof read in conjunction with the accompanying drawings wherein.

DETAILED DESCRIPTION

Figure 1:
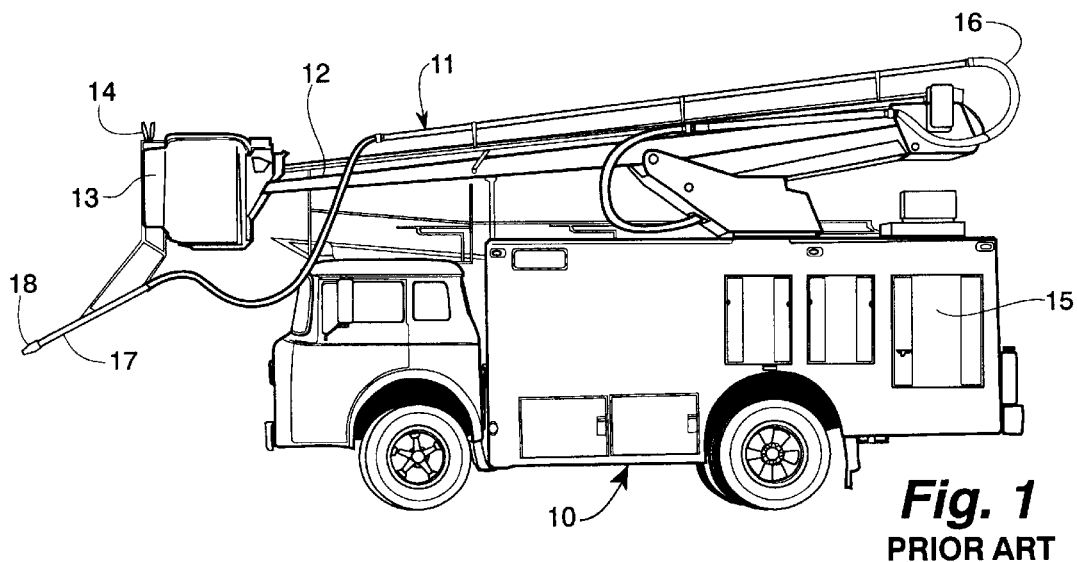
FIG. 1 is a perspective view of a delivery vehicle having conventional forced air de-icing equipment mounted thereon.

Referring now to the drawings, FIG. 1 shows a perspective view of a delivery vehicle 10 chassis having conventional forced air de-icing system 11 equipment mounted thereon. Vehicle 10 with system 11 thereon may be similar to that described by Williams (U.S. Pat. No. 5,244,168) as including a movable articulable aerial boom 12 having an operator platform 13 disposed at the distal end thereof, operator platform 13 including suitable controls 14 for selectively positioning boom 12 and operator platform 13 (bucket, basket or enclosed cab). Suitable air compressor components are disposed within delivery vehicle 10 such as indicated at 15 and are operatively connected to conduit 16 for delivery of high velocity air onto the surface of an aircraft (not shown) for removal of snow and ice from the aircraft. Conduit 16 terminates at end 17 near, and is operatively attached to, operator platform 13 as suggested in FIG. 1 in order to enable an operator stationed in operator platform 13 to selectively maneuver conduit 16 end 17 utilizing controls 14 for selectively aiming the high speed air flow onto the surface of an aircraft. A high speed air jet nozzle 18 such as that described by Numbers (U.S. Pat. No. 5,755,404) may be disposed at end 17 of conduit 16 for optimum forced air delivery to the surface of the aircraft.

Conventional forced air de-icing systems such as that depicted in FIG. 1 and as just described are generally based on gas turbine auxiliary power units for the compressed air source mounted within the delivery vehicle 10 with the air conduit 16 routed along aerial boom 12. The compressed air source functionally includes an air compressor, a power supply to drive the compressor, and a means of transmission. These functions are self-contained in the gas turbine auxiliary power unit 15. The existing method of control is direct manual control by the operator(s). The operator(s) control the position of the vehicle, the position of the aerial device and platform, and the direction of the high speed air jet nozzle. The effectiveness of the forced air de-icing system depends on the training and skill of the operator. The operator(s) must also determine by visual inspection when the de-icing operation is complete.

Figure 3A:
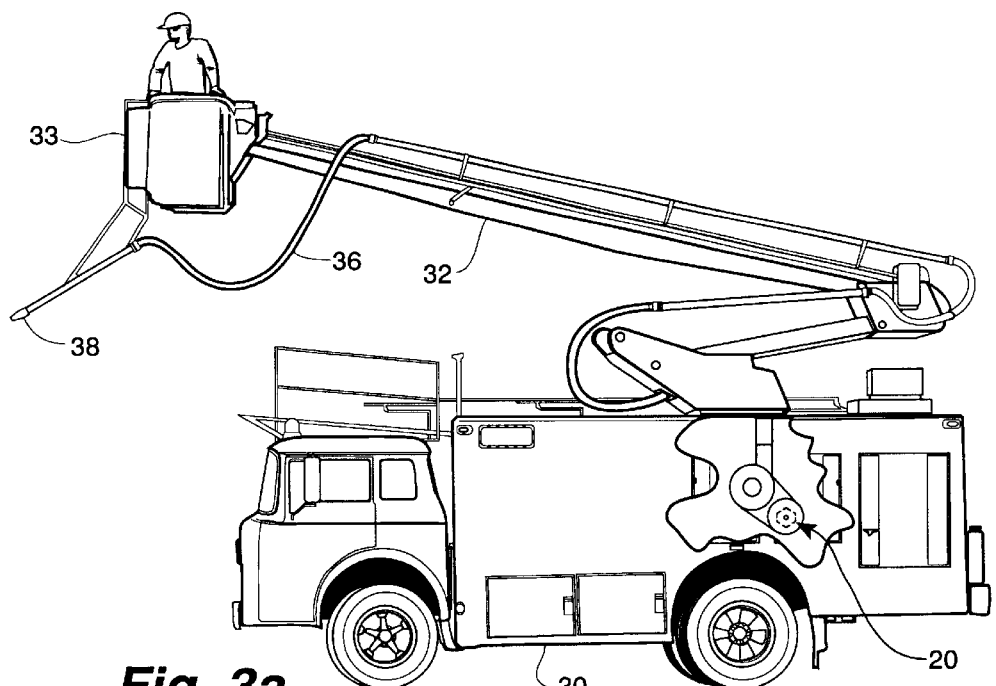
FIG. 3a illustrates one representative conventional configuration for mounting the compressed air components of FIG. 2 within a delivery vehicle.
Figure 2:
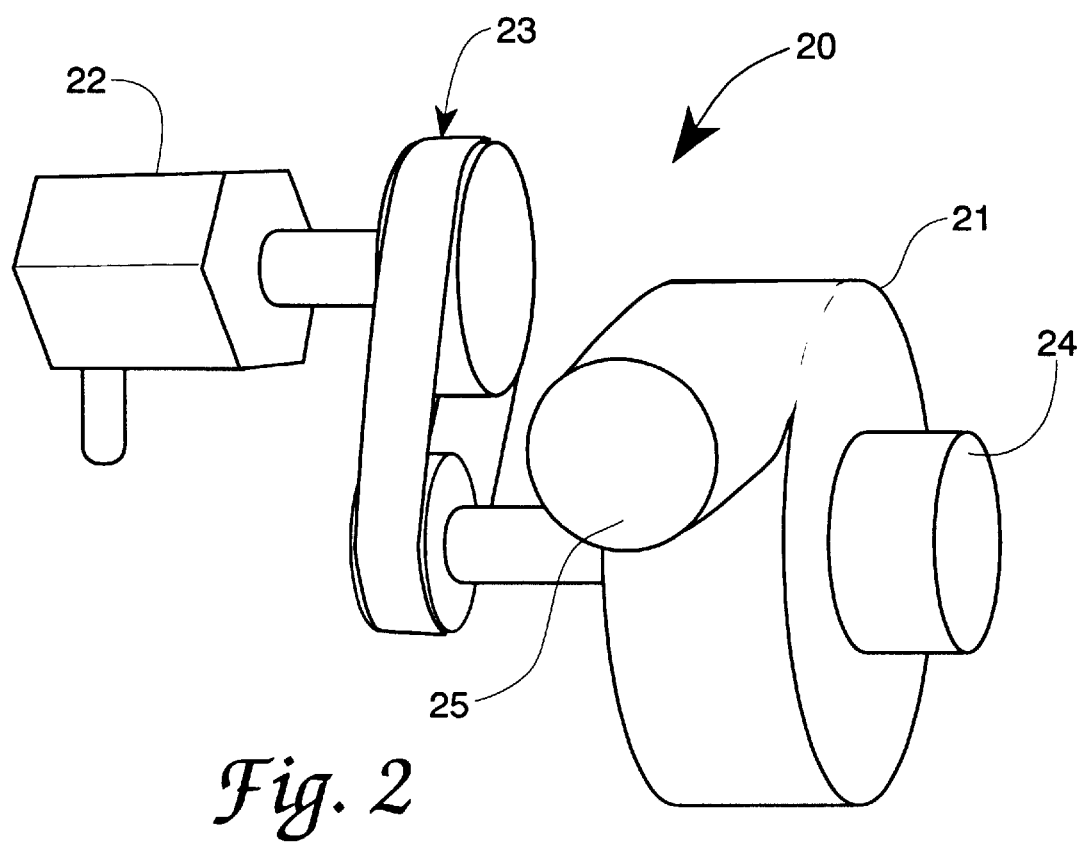
FIG. 2 is a schematic of the compressed air components useful in the forced air de-icing system according to the invention.
Figure 3B:
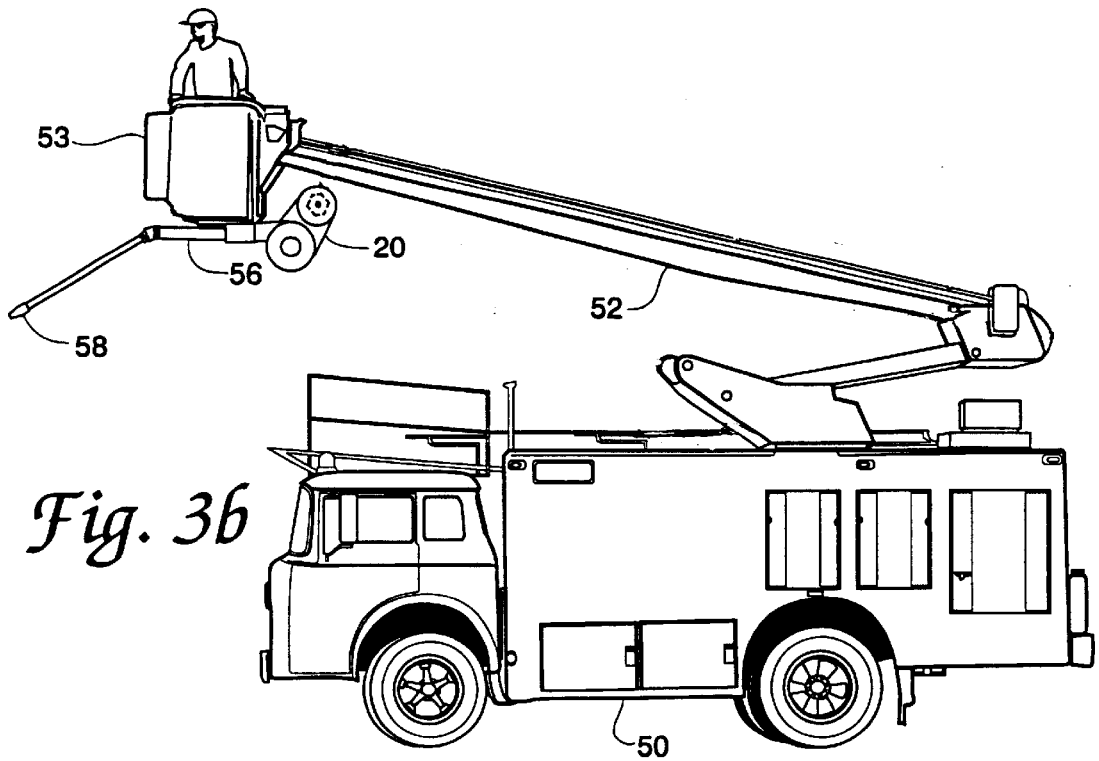
FIG. 3b illustrates the mounting of the compressed air components on the operator platform disposed on the distal end of an aerial boom mounted on a delivery vehicle.

Referring now to FIG. 2, shown therein is a schematic of the compressed air components useful in the forced air de-icing system according to the invention. FIG. 3a illustrates placement of the compressed air components of FIG. 2 within a delivery vehicle 30 substantially as with the conventional systems just described. FIG. 3b illustrates the compressed air components mounted on the operator platform disposed near the forced air delivery nozzle, and FIG.

3c illustrates the compressed air components mounted on an aerial boom with video camera and automatic sensing devices instead of an operator platform.

Referring now specifically to FIG. 2, and in accordance with a beneficial feature of the invention, the gas turbine auxiliary power unit customarily associated with conventional systems such as that depicted in FIG. 1 and mounted within the delivery vehicle (FIGS. 1 and 3a), is replaced in the system of the invention herein with a compressed air source system 20 disposed along a supporting aerial boom and preferably on or near the operator platform (FIG. 3b) separate and apart from and external to the delivery vehicle. Compressed air supply system 20 may typically comprise an air compressor 21, power supply 22, and transmission 23 components that operate collectively as the compressed air source in the overall forced air de-icing system of the invention. In the operation of system 20, power supply 22 in the form of a motor or engine powers compressor 21 through transmission 23. Ambient air is admitted through inlet 24 of compressor 21 and is directed to a high speed airjet nozzle (not shown in FIG. 2) through outlet 25. The preferred placement of the compressed air source system 20 as close as practical to the high speed air jet nozzle (18,38) clearly substantially reduces the required length of the air conduit (16,36), allows the forced air delivery system to be structured separately from the supporting delivery vehicle and aerial boom, substantially obviates any need for insulation on the conduit, and, as suggested below, allows more automated control of the de-icing process by relieving the operator(s) of some of the control tasks.

Compressor 21 of compressed air source system 20 preferably has an air flow capacity of at least 100 lb/min or greater at a pressure ratio of about 2:1. This preferred specification may be met by utilizing any of the commercially available centrifugal compressors used as superchargers or turbochargers for automotive gasoline or diesel engines (for example, Allied Signal Automotive/Garrett Division Model TV9406 turbocharger), or centrifugal compressors used for aircraft cabin pressurization (for example, Allied Signal LA Division Model P-3C SDC PN 206400), or centrifugal compressors used for gas turbine aircraft or helicopter engines (for example, Allison Model 250 C20R9), or multistage industrial blowers (for example, two (2) Sundstrand Fluid Handling Co. Model B-3230 in series), or rotary lobed compressors (for example, Roots-Dresser Model 412 or 616J). Engine or marine superchargers or turbochargers are the preferred selection as easily meeting operational requirements of the invention and are relatively light in weight and least expensive. Components designed for aircraft use easily meet the operational requirements but are expensive to acquire, whereas the blower and rotary lobed compressors marginally meet the operational requirements but are relatively heavy in weight.

Power supply 22 of compressed air source system 20 typically needs to be of at least 100 to 150 hp or greater to meet the operational requirements of the invention. This may be accomplished by utilizing a hydraulic motor (such as Parker Hannifin Model M3-900), or an automotive gasoline or diesel engine (such as KHD Deutz Model BF6L913 air cooled 6 cylinder diesel), or an electric motor (such as Leeson Electric Motors Model G150151). The hydraulic motor may be the preferred selection because it is the lightest in weight and offers installation related advantages. Automotive engines easily meet the operational power requirement of the invention, but are bulky, noisy and heavy. Electric motors typically require a source of electrical power not ordinarily available on the de-icing vehicle.

Operational requirements for transmission 23 of compressed air source system 20 are dependent upon the input rotary speed of the selected compressor 21 and the output rotary speed of power supply 22. Rotary speed ratios (input:output) of 1:1 up to 10:1 may be attained utilizing belt or chain driven pulley sets (such as Habiset Belts, Inc. 6.5:1 belt/pulley set) or gear sets (such as XTEC, Inc. 10:1 gear set, SPECO Corp. gear set). The belt or chain pulley set is inexpensive but is limited in speed ratio and is susceptible to undesirable wear. The gear set can easily meet the higher speed ratios but is the more expensive of the selections.

The installation of compressed air source system 20 to a supporting de-icing vehicle chassis 30 in the conventional systems, as suggested in FIGS. 1 and 3a and as discussed above, may be accomplished by mounting power supply 22 and air compressor 21 in vehicle chassis 30, connected by transmission 23, with a relatively long air conduit 36 routed along aerial boom 32 to nozzle 38 disposed near operator platform 33. This arrangement suffers from the disadvantage that the bulkiness of conduit 36 must be routed from the vehicle chassis along aerial boom 32 device to nozzle 38. Articulation of aerial boom 32 may be restricted by this arrangement, and operational inefficiencies of this arrangement are associated with the relatively long length of conduit 36.

In accordance with the principal feature of the invention, the preferable arrangement as shown in FIG. 3b places compressed air system 20, including power supply 22 and air compressor 21 connected by transmission 23, on and more preferably beneath operator platform 53. Compressor 21 is therefore connected to nozzle 58 by a very short conduit 56. The arrangement of FIG. 3b substantially eliminates air pressure loss and air flow energy loss between compressed air system 20 and nozzle 58 associated with air conduit length, and eliminates potential interference between the conduit and aerial boom 52. Further, the arrangement of FIG. 3b substantially reduces the size of the de-icer system required to be installed on the vehicle chassis, facilitates any required installation on, removal from and reinstallation on the vehicle chassis of the essential de-icer system components, and, accordingly, substantially reduces maintenance costs associated with ownership and operation of the de-icer system.

The foregoing description provides a system for the removal of ice and snow from the surface of an aircraft utilizing a high speed forced air jet stream. It is noted that the invention also contemplates the use of de-icer fluid such as that described by Williams, supra, incorporated herein by reference, optionally by the addition of heated or unheated de-icer fluid (not shown in the drawings) into the compressed air stream within conduit 56. It is further noted that, although the forced air aircraft de-icing system of the invention was described in the foregoing as disposed on and operable from a supporting vehicle, the system of the invention may also be disposed on a movable articulable aerial boom mounted to a stationary support.

Figure 3C:
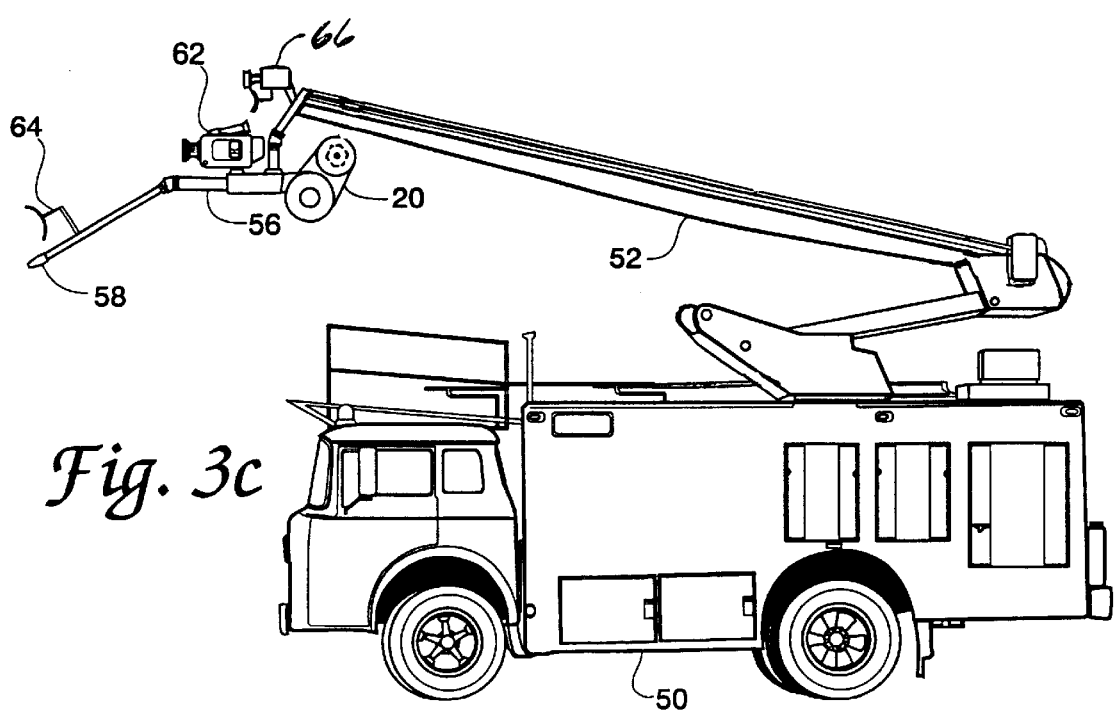
FIG. 3c illustrates the mounting of the compressed air components without an operator platform on the distal end of an aerial boom mounted on a delivery vehicle.

Additional advantages of the invention as described in detail in the foregoing description of the preferred embodiments, are that improved control methods may be utilized. The position of the nozzle may be controlled automatically via a pre-programmed movement schedule. For example, the operator platform in FIG. 3b could be automatically translated parallel to an aircraft wing, while the operator manually aims the direction of the air jet, thus relieving the operator of the stressful task of positioning the operator platform relative to the aircraft. Further, nozzle position and airjet direction may be remotely controlled without the need for an operator platform. In FIG. 3c, automatic position control may be enabled by remote video camera 62 and/or position sensors 64 such as ultrasound, infrared or laser range devices. Also, as illustrated in FIG. 3c, automatic position control may be enabled by ice, snow and frost detection system 66 disposed on the distal end of boom 52, and may include ultrasound, infrared or laser detector systems or other as might occur to the skilled artisan practicing the invention.

The invention therefore provides an improved forced air aircraft de-icer control system. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. In a system for de-icing the surface of an aircraft using forced air, the system including a source of high speed forced air, a nozzle operatively connected to the source of high speed forced air for directing high speed forced air onto a surface of an aircraft to remove snow or ice from the surface of the aircraft, and a movable boom with an operator platform at the distal end thereof for selectively positioning the nozzle near the surface of the aircraft, an improvement wherein the source of high speed forced air and the nozzle operatively attached thereto are disposed below or within the operator platform whereby the distance between the source of high speed air and the nozzle is minimized.

2. The improvement of claim 1 wherein the boom, source of high speed air and nozzle are disposed on a vehicle.

3. The improvement of claim 1 further comprising small quantities of water and/or cleaning agents to be injected into the air stream either upstream or downstream of the nozzle to wash the aircraft.

4. The improvement of claim 1 wherein the source of high speed forced air includes an air compressor, a power supply and a transmission interconnecting said compressor and said power supply.

5. The improvement of claim 4 wherein said compressor has an air flow capacity of at least 100 lb/min at a pressure ratio of about 2:1.

6. The improvement of claim 4 wherein said power supply is a hydraulic motor.

7. The improvement of claim 1 further comprising a video camera disposed on the boom near the nozzle whereby the surface of the aircraft and nozzle may be remotely observed.

8. The improvement of claim 1 further comprising a position sensor disposed on the distal end of the movable boom near the nozzle, whereby the position of the nozzle near the surface of the aircraft may be remotely sensed.

9. A system for removing ice, snow and other frozen deposits from a surface, comprising:
   (a) a source of high speed forced air;
   (b) a nozzle operatively connected to the source of high speed forced air for directing high speed forced air onto a surface in the removal of snow or ice from the surface;
   (c) a movable boom with an operator platform at the distal end thereof for selectively positioning the nozzle near the surface;
   (d) wherein the source of high speed forced air and the nozzle operatively attached thereto are disposed below or within the operator platform whereby the distance between the source of high speed air and the nozzle is minimized.

10. The system of claim 9 wherein said boom, source of high speed air and nozzle are disposed on a vehicle.

11. The system of claim 9 further comprising small quantities of water an/or cleaning agents to be injected into the air stream either upstream or downstream of the nozzle to wash the aircraft.

12. The system of claim 9 wherein said source of high speed forced air includes an air compressor, a power supply and a transmission interconnecting said compressor and said power supply.

13. The system of claim 12 wherein said compressor has an air flow capacity of at least 100 lb/min at a pressure ratio of about 2:1.

14. The system of claim 12 wherein said power supply is a hydraulic motor.

15. The system of claim 9 further comprising a video camera disposed on said boom near said nozzle whereby the surface and said nozzle may be remotely observed.

16. The system of claim 9 further comprising a position sensor disposed on the distal end of the movable boom near the nozzle, whereby the position of the nozzle near the surface of the aircraft may be remotely sensed.

17. The system of claim 9 further comprising an ice detection system disposed on the distal end of the movable boom, whereby frozen deposits on the surface of the aircraft may be remotely sensed.

18. The system of claim 12 wherein said transmission is a belt drive.

\* \* \* \* \*